Patented Feb. 11, 1941

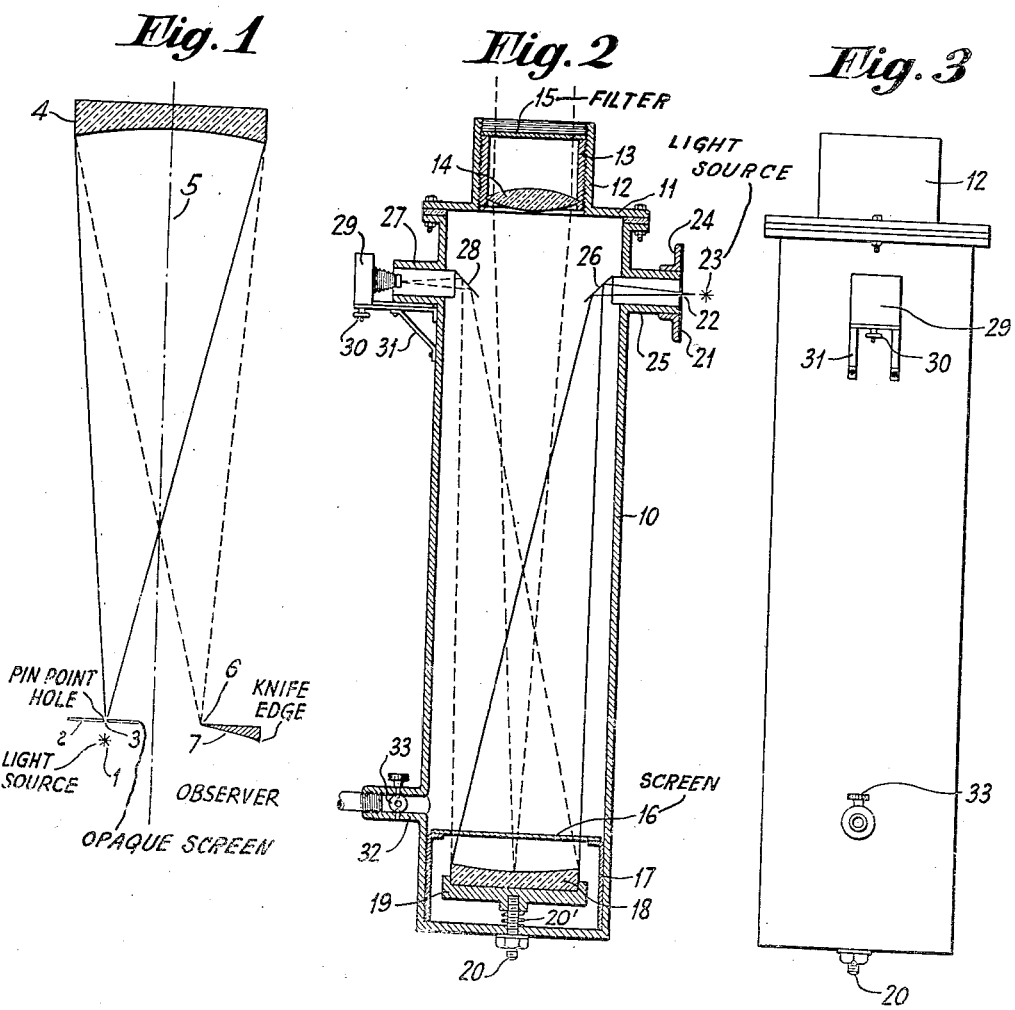

2,231,170

UNITED STATES PATENT OFFICE 2,231,170

OBJECT DETECTOR

Nils E. Lindenblad, Port Jefferson, N. Y., assignor to Radio Corporation of America, a corporation of Delaware Application January 20, 1938, Serial No. 185,805

8 Claims. (Cl. 250—1)

This invention relates to a new and novel vision device for visually observing objects through fog.

An object of this invention is to provide a system wherein infra-red rays are employed to increase the normal vision, through fog, of objects which are generally indistinct or totally obscured by the fog.

A feature of this invention is the employment of infra-red rays with a suitable filtering means wherein an object may be clearly observed through the presence of fog in the atmosphere.

This invention has been conceived in two general forms, the simplest one being that of a purely optical method having no moving parts in its optical system. The other method employs in its optical system a moving element or rotating scanning disc.

This invention will best be understood by referring to the accompanying drawing, in which:

Fig. 1 is a schematic diagram of the principle employed in the purely optical method;

Fig. 2 is a sectional view of the visual apparatus;

Fig. 3 is a side view of Fig. 2.

Referring now to Fig. 1 of the drawing, as the purely optical method of this invention makes use of the extremely sensitive features of the so-called Focaults mirror test, this test will be described in conjunction with Fig. 1. The Focaults mirror test is generally used for determining the process of grinding and polishing mirrors for astronomical telescopes and is employed to accurately manufacture the modern mirrors used in large telescopes of today. A pin point of light source 1 is maintained by employing an opaque screen 2 having a small aperture 3. The pin point light source is located in front of a spherical mirror 4, the distance being greater than that of the so-called focal distance because otherwise the reflecting waves would not focus again after reflection. It is preferable that the distance between the pin point source of light and that of the mirror be substantially twice that of the focal distance. If the light source is located at twice the focal distance and the mirror is spherical in shape, the focus of the reflected waves will occur at the same distance, that is, the radius of the mirror. Thus located the light source is said to be located at the conjugate focus of the mirror. The light source 1 is then located slightly to one side of the central axis 5 of the mirror 4 and the reflected focus will then occur on the opposite side of axis 5 at a point 6. If the light source is observed on the surface of the mirror along a knife edge 7 at the reflected focus, the mirror will appear as an evenly illuminated disc. However, if the mirror's surface is not perfectly spherical in shape, it will no longer give the impression of an evenly illuminated disc, but will instead produce certain shade patterns for the reason that the reflected light from all sections of the mirror will not focus at the same distance. A professional mirror manufacturer can from these shades, change very accurately the shape of the mirror and perfect its surface.

The above mentioned tests are carried on in very still air, for if one merely heats the air with the hand several feet on the side of the light beam at the mirror end of the light circuit, violent heat waves will be observed as rushing past the surface of the mirror. The reason for this phenomena occurring and the heat waves being so plainly visible is that the heat changes the refractive index of the air, and thus changes the focal point of the reflected light. As the heat is not evenly distributed through the air, the focal point of light from different sections of the mirror becomes focused differently and thus gives a picture of this very heat distribution.

The apparatus of this invention is shown in detail by Fig. 2 in which a casing 10 in the form of a relatively long cylindrical metal tube is provided for containing the principal elements employed in this device. The upper portion of container 10 has a cover 11 which terminates in a tubular neck portion 12 which is internally threaded for lens 14. Directly in front of lens 14 there is located a filter 15 which is opaque to visible light rays but transparent to infra-red rays. The distance from filter 15 and lens 14 is such that the lens focuses infra-red rays on a screen 16 located in the lower portion of container 1 and secured thereto by a mounting member 17. At the bottom of casing 10 there is located a spherical shaped mirror 18 preferably of fused quartz. Mirror 18 has an adjustable mounting 19. By means of a screw 20 and a spring 20' the focal distance between lens 14 and mirror 18 can be changed. In the upper portion of container 10 there is located a disc 21 having a pin point aperture 22 through which the source 23 of visible light passes illumination. Disc 21 is mounted upon a flanged shaped member 24 which is secured to an extension member 25. Located within the casing 10 at extension member 25 there is provided a small reflecting mirror 26 for reflecting the visible light rays to the surface of mirror 18. Diametrically opposite extension member 25 there is located a second extension member 27 having a second mirror 28 similar to that of mirror 26 which is also arranged to reflect the light waves after having been filtered by filter 15 then passing through screen 16 and reflected from mirror 18 to any suitable optical indicating instrument 29. In a preferred embodiment of this invention, there may be positioned in front of extension 27 a camera 29 having an adjustable mounting screw 30 in which camera 29 may be adjusted on the mounting bracket 31. In place of camera 29 any other train of optical devices may be employed to observe the desired object. As mentioned above, the presence of air within the container 10 will affect the remarkable sensitive phenomena, it is therefore necessary to evacuate vessel 10 for this purpose. In the lower portion of the vessel there is located a pipe fitting 32 provided with a valve 33. To observe images generally obscured by fog, the disc portion 21 is directed toward the desired source of light 23. The screen 16 located in front of mirror 18 is preferably made of some cellulose compound containing sufficient minute black pigments to absorb the infra-red radiation without substantially destroying its transparency to visible light from source 23. In other words, it should have the structure of that of colored glass. It is well-known in the glass industry to color glass by mixing particles of metal of colloidal dimensions, for example, a high grade ruby glass has been made by the addition of colloidal gold. The metal added to the glass does not cause substantial dispersion of the light passing through the glass. Generally, the black pigment added to the cellulose screen provides an absorbent for the infra-red radiation falling thereon without causing excessive dispersion of the visible light from source 23 passing through the screen 16. The presence of this pigment is necessary to make the screen heat absorbent. Now, if an infra-red picture is projected upon the screen 16 from light source 23, the thickness of the screen will vary in accordance with the details of the picture by heat from the infra-red rays expanding the thickness of screen 16. The reflected focus of the visible light from the pin point source 22 will vary by the absorbed heat changing thickness of screen 16 in proportion to the details and outline of the image picked up at 23. This variation in thickness upsets the refraction and there will then be observed upon the ground glass of camera 29 a visible copy of the invisible infra-red picture on the screen 16.

While only a few forms of this invention have been disclosed, it is to be distinctly understood that this invention is not to be limited by the precise modifications shown.

What is claimed is:

1. In combination, a point source of visible light, means for forming a real image of said point source at a location, viewing means at said location, a screen substantially transparent to visible light but at least partially opaque to infra red radiation located in the path of said visible light rays from said source to said location and means for producing an image in infra red radiation on said screen.

2. In combination, a point source of visible light, means for forming a real image of said point source at a location, viewing means at said location, a screen substantially transparent to visible light but at least partially opaque to infra red radiation located in the path of said visible light rays from said source to said location, said screen being characterized in that its thickness is affected in accordance with the intensity of infra red radiation absorbed thereby and means for producing an image in infra red radiation on said screen.

3. A device for observing objects through a fog comprising an elongated container, a concave mirror at one end of said container, a screen substantially transparent to visible light but at least partially opaque to infra red radiation located in front of said mirror, said screen being characterized in that its thickness varies in accordance with the infra red radiation absorbed thereby, a lens for focusing infra red radiation on said screen located at the end of said container opposite said mirror, a filter transparent only to infra red radiation covering said lens, a point source of light and viewing means located substantially at the conjugate focal plane of said mirror.

4. A device for observing objects through a fog comprising an elongated container, a concave mirror at one end of said container, a screen substantially transparent to visible light but at least partially absorbent to infra red radiation located in front of said mirror, said screen being characterized in that its thickness varies in accordance with the infra red radiation absorbed thereby, a lens for focusing infra red radiation on said screen located at the end of said container opposite said mirror, a filter transparent only to infra red radiation covering said lens, a point source of light and viewing means located substantially at the conjugate focal distance from said mirror.

5. A device for observing objects through a fog comprising an elongated container, a concave mirror at one end of said container, a screen substantially transparent to visible light but at least partially opaque to infra red radiation located in front of said mirror, said screen being characterized in that its thickness varies in accordance with the infra red radiation absorbed thereby, a lens for focusing infra red radiation on said screen located at the end of said container opposite said mirror, a filter transparent only to infra red radiation covering said lens, apertures on opposite sides of said container, a point source of light outside said container and before one of said apertures, means for directing light from said source to said mirror, means for directing light from said mirror out through said other aperture and viewing means at said other aperture, the light path from said source to said viewing means being equal to four times the focal length of said mirror.

6. A device for observing objects through a fog comprising an elongated container, a concave mirror at one end of said container, a screen substantially transparent to visible light but at least partially absorbent to infra red radiation located in front of said mirror, said screen being characterized in that its thickness varies in accordance with the infra red radiation absorbed thereby, a lens for focusing infra red radiation on said screen located at the end of said container opposite said mirror, a filter transparent only to infra red radiation covering said lens, apertures on opposite sides of said container, a point source of light outside said container and before one of said apertures, means for directing light through said source to said mirror, means for directing light from said mirror out through said other aperture and viewing means at said other aperture, the light path length from said source and said viewing means to said mirror being equal to the conjugate focal length of said mirror.

7. A device for observing objects through a fog comprising a relatively long container, a concave mirror at one end of said container, a screen substantially transparent to visible light but at least partially opaque to infra red radiation located in front of said mirror, said screen being characterized in that its thickness varies in accordance with the infra red radiation absorbed thereby, a lens for focusing infra red radiation on said screen located at the end of said container opposite said mirror, a filter transparent only to infra red radiation covering said lens, means for forming a real image of said objects in infra-red radiation on said screen, a point source of light outside said container, means for directing light from said source to said mirror, means for directing light from said mirror out to viewing means outside of said container, the light path length from said source and said viewing means to said mirror being equal to the conjugate focal length of said mirror.

8. A device for observing objects through a fog comprising a relatively long evacuated container having at least two apertures therein, a concave container at one end of said mirror, a screen substantially transparent to visible light but at least partially opaque to infra red radiation located in front of said mirror, a lens for focusing infra red radiation on said screen located at the end of said container opposite said mirror, a filter transparent only to infra red radiation covering said lens, a point source of light outside said container and before one of said apertures, means for directing light through said source to said mirror, means for directing light from said mirror out through said other aperture and viewing means at said other aperture, the light path length from said source and said viewing means to said mirror being equal to the conjugate focal length of said mirror.

NILS E. LINDENBLAD.